United States Patent [19]

Krätschmer

[11] 4,275,116
[45] Jun. 23, 1981

[54] METALLIZED HOT STAMPING FOIL FOR DECORATING THREE-DIMENSIONAL OBJECTS

[75] Inventor: Horst D. Krätschmer, Seukendorf, Fed. Rep. of Germany

[73] Assignee: Leonhard Kurz, Furth, Fed. Rep. of Germany

[21] Appl. No.: 36,009

[22] Filed: May 4, 1979

[30] Foreign Application Priority Data

Jun. 6, 1978 [JP] Japan .................................. 53-68247

[51] Int. Cl.³ ............................................... C09J 7/02
[52] U.S. Cl. ..................................... 428/336; 428/344; 428/347; 428/349; 428/352; 428/354; 428/457; 428/458; 428/463; 428/467; 428/914
[58] Field of Search ............... 428/457, 458, 463, 467, 428/344, 347, 349, 352, 354, 355, 220, 914, 336; 427/294, 383 R, 383.1

[56] References Cited

U.S. PATENT DOCUMENTS

| | | | |
|---|---|---|---|
| Re. 28,883 | 6/1976 | Willdorf | 428/458 X |
| 3,681,180 | 8/1972 | Kent | 428/458 X |
| 3,775,226 | 11/1973 | Windorf | 428/458 X |
| 3,776,805 | 12/1973 | Hansen | 428/458 X |
| 3,953,635 | 4/1976 | Dunning | 428/349 X |
| 4,084,032 | 4/1978 | Pasersky | 428/914 X |

Primary Examiner—Ellis P. Robinson

[57] ABSTRACT

The invention concerns metallized hot stamping foils for decorating three-dimensional objects. In order to achieve a decoration of the object with the hot stamping foil which is free from cracks in the applied stamping film there is proposed a foil comprising a thermoadhesive layer, a first lacquer layer, a metal layer, a second lacquer layer, a release layer and a carrier layer laminated in this order, wherein a laminate of the first lacquer layer, metal layer and second lacquer layer has a ductility represented by an elongation rate ranging from 1.5 to 4.0, the elongation rate being the ratio of length after elongation to length before elongation. The first lacquer layer may have thermoadhesive properties which allows dispensing a separate thermoadhesive layer.

4 Claims, 3 Drawing Figures

METALLIZED HOT STAMPING FOIL FOR DECORATING THREE-DIMENSIONAL OBJECTS

BACKGROUND OF THE INVENTION

FIELD OF THE INVENTION

The present invention relates to metallized hot stamping foils. More particularly, the invention relates to metallized hot stamping foils employed for decorating a surface of a three-dimensional object by means of three-dimensional molding.

DESCRIPTION OF THE PRIOR ART

Conventional metallized hot stamping foils have a multi-layer structure as shown in FIG. 1 in which a thermoadhesive layer 11, a metal layer 12 of vacuum evaporated metal or fine powder metals as of aluminium, chromium, copper, nickel, and conventional alloys used for hot-stamping foil, a lacquer layer 13 for protecting the metal layer 12, a release layer 14 of a releasing agent, wich facilitates the peeling off of the thermoadhesive layer 11, metal layer 12 and lacquer layer 13 from a carrier 15 after the respective foil is hot-stamped, and the various layers are laminated in this order. Generally, the metallized hot stamping foils having the above-described structure are two-dimensionally hot stamped by up-and-down stamping or rolling stamping. Therefore, when metallized hot stamping foils are used for decorating a surface of a three-dimensional object, the hot stamping operation is complicated because up-and-down stamping or rolling stamping must be separately performed for every flat surface of the three-dimensional object. Further, the decorated surface obtained has seams which are undesirable for decoration purposes.

As a method of stamping a hot stamping foil on a surface of a three-dimensional object without a seam, three-dimensional molding such as insert-molding and the like is known. However, when a conventional metallized hot stamping foil is stamped on a surface of a three-dimensional object by three-dimensional molding, there are formed cracks in the applied stamping film. Therefore, a good stamping on a three-dimensional object cannot be effected. That means that a surface of a three-dimensional object cannot be satisfactorily decorated without a seam with conventional metallized hot stamping foils.

SUMMARY OF THE PRESENT INVENTION

In view of above-mentioned defects of the conventional metallized hot stamping foils, the primary object of the present invention is to provide a metallized hot stamping foil which can be stamped without a seam on a surface of a three-dimensional object by three-dimensional molding.

The inventor of the present invention has conducted various researches on metallized hot stamping foils in order to accomplish the above-mentioned object. As the result of the investigations, if was found that the conventional metallized hot stamping foils were markedly low in ductility, and that a metal layer and a lacquer layer of a metallized hot stamping foil should have proper ductility so that cracks do not appear in the applied stamping film when the metallized hot stamping foil is stamped on a surface of a three-dimensional object by three-dimensional molding. Also, it was found that the above-mentioned proper ductility can be obtained by placing a metal layer between two lacquer layers.

The metallized hot stamping foil of the present invention employed for decorating a surface of a three-dimensional object is characterized in that a thermoadhesive layer, a first lacquer layer, a metal layer, a second lacquer layer, a release layer and a carrier are laminated in this order and a laminate of the first lacquer layer, the metal layer and the second lacquer layer has a ductility represented by an elongation rate (ratio of length after elongation to length before elongation) ranging from 1.5 to 4.0.

In the above-mentioned metallized hot stamping foil of the present invention, when the first lacquer layer has thermoadhesive properties, served as a thermoadhesive layer. In such case, it is not necessary to provide a separate thermoadhesive layer.

DESCRIPTION OF THE PREFERRED EMBODIMENTS

Figure 1:
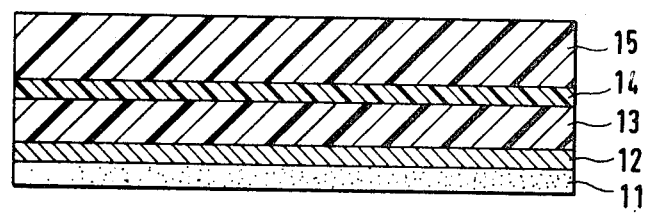
FIG. 1 is a schematic sectional view of a conventional metallized hot stamping foil.
Figure 2:
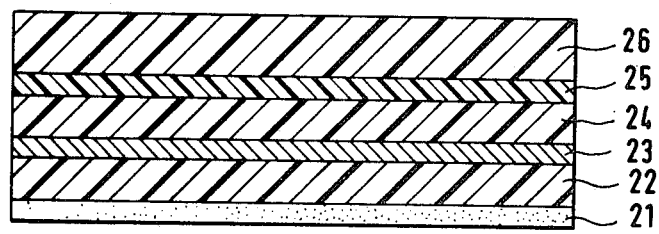
FIGS. 2 and 3 are schematic sectional views of metallized hot stamping foils of preferred embodiments of the present invention.

As shown in FIG. 2, in the metallized hot stamping foil of a first embodiment of the present invention, a first lacquer layer 22 is provided between a thermoadhesive layer 21 and a metal layer 23, this being a remarkable difference to the conventional foil as shown in FIG. 1. On the metal layer 23, a second lacquer layer 24, a release layer 25 and a carrier 26 are provided in this order as they are provided in conventional metallized hot stamping foil. By placing the metal layer 23 between the first lacquer layer 22 and the second lacquer layer 24, a metallized hot stamping foil having better elongation properties of the film containing the metal layer and being transferred during the stamping process in comparison with the conventional transferable films can be obtained. The result of the experiments conducted by the inventor indicated that when the elongation rate of the laminate of the first lacquer layer 22, the metal layer 23 and the second lacquer layer 24 was within the range of 1.5 to 4.0, a metallized hot stamping foil could be obtained giving good stamping without cracks when stamped by three-dimensional molding. In this specification, "elongation rate" means the ratio of the length of the laminate after the laminate is elongated to the length of the laminate before the laminate is elongated when the laminate of a certain length is elongated lengthwise to the extent that the laminate can no longer be elongated without detrimental influence on its properties, especially appearance. The conventional metallized hot stamping foil as shown in FIG. 1 is markedly low in ductility. Accordingly, when a conventional metallized hot stamping foil is stamped on a surface of a three-dimensional object by three-dimensional molding, cracks appear in the applied stamping film. The result of the measurement conducted by the inventor showed that the elongation rate of the laminate of the metal layer 12 and the lacquer layer 13 contained in the conventional metallized hot stamping foil was usually in the range of about 1.02 to 1.03 and at most not more than 1.1.

The lacquers employed in the first lacquer layer 22 and the second lacquer layer 24 of the metallized hot stamping foil of the present invention can be conventional lacquers such as polyester, acrylic resin, nitrocellulose, and the like. In view of the above-mentioned ductility, the lacquers to be employed should preferably have flexibility. The lacquer employed in the first lacquer layer 22 may be or may not be the same as that employed in the second lacquer layer 24. The thicknesses of the first lacquer layer 22 and the second lacquer layer 24 are determined by the kind of the lacquer employed, the flexibility thereof, and the use of the metallized hot stamping foil. Both the first lacquer layer 22 and the second lacquer layer 24 usually have a thickness ranging from about 1 to 10μ. Generally, the range of the above-mentioned elongation rate can be obtained more easily when the first lacquer layer 22 and the second lacquer layer 24 are designed so that the former is thicker than the latter.

As metals employed in the metal layer 23 metals such as aluminium, chromium, copper, nickel, and conventional alloys used for hot-stamping and the like which are generally employed in conventional metallized hot stamping foils can be used. The metal layer 23 can be formed by vacuum evaporation or by using a fine powder of these metals. The thickness of the metal layer 23 is in the range of about 0.01 to 0.1μ, preferably 0.03 to 0.06μ when vacuum evaporation is used, and about 2 to 6μ where powder (for instance aluminium pigment) is used to form the layer.

As mentioned, the laminate of the first lacquer layer 22, metal layer 23 and second lacquer layer 24 must have a ductility represented by an elongation rate ranging from 1.5 to 4.0. The kind of lacquers employed in the first lacquer layer 22 and the second lacquer layer 24, the thickness of the first lacquer layer 22 and the second lacquer layer 24, the thickness of the metal layer 23, and the like must be determined taking into consideration the necessary properties required originally for the metallized hot stamping foils so that the elongation rate of the laminate obtained is within the above-mentioned range.

As materials for the thermoadhesive layer 21, the release layer 25 and the carrier 26, conventional materials which are normally employed in corresponding layers of conventional metallized hot stamping foils, can be used. The thickness of the thermoadhesive layer 21 and the release layer 25 are usually within the ranges of about 1 to 4μ and about 0.1 to 2μ, respectively.

In the metallized hot stamping foil of the present invention as shown in FIG. 2, a lacquer having thermoadhesive properties can be employed in the first lacquer layer 22. In this case the first lacquer layer 22 can be combined with the thermoadhesive layer 21. It is then not necessary to provide a separate thermoadhesive layer 21.

Figure 3:
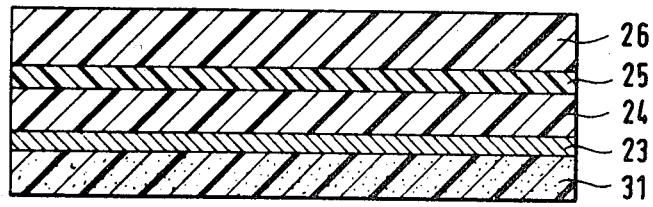

When a lacquer having thermoadhesive properties is employed in the first lacquer layer 22, the metallized hot stamping foil of the present invention has a multi-layer structure as shown in FIG. 3, i.e. the metallized hot stamping foil of this embodiment has a multi-layer structure in which a first lacquer layer 31 has thermoadhesive properties, a metal layer 23, a second lacquer layer 24, a release layer 25 and a carrier 26 are laminated in this order. The tickness of the first lacquer layer having thermoadhesive properties 31 is usually within the range of about 1 to 10μ. Of course, the laminate of the first lacquer layer 31, the metal layer 23 and the second lacquer layer 24 must be designed so that the laminate has an elongation rate ranging from 1.5 to 4.0.

As is described hereinabove, the metallized, transferable stamping films of the hot stamping foils of the present invention have a good ductility. Therefore, when the foils are stamped on a surface of a three-dimensional molding, such as insert-molding and the like, the foils provide a good stamping film in which cracks do not appear. A metallized hot stamping foil which can be hot stamped without a seam in the applied stamping film on a surface of a three-dimensional object by three-dimensional molding, such as the metallized hot stamping foil of the present invention, has not heretofore been known. Therefore, the present invention has a great industrial value.

The method of "insert moulding" comprises decorating (by stamping or applying in line at an extrusion head) a planar vacuum formable foil as ABS plastics material with a hot stamping film, said foil being afterwards vacuum formed to the desired shape, whereafter the vacuum formed and decorated ABS foil is placed into the injection mould, which is then filled by injection so that the ABS foil will constitute one surface of an article.

I claim:

1. A metallized hot stamping foil for decorating three-dimensional objects consisting essentially of a thermoadhesive layer, a first lacquer layer, a metal layer, a second lacquer layer, a release layer and a carrier laminated in said order, the laminate of said first lacquer layer, metal layer and second lacquer layer having a ductility represented by an elongation rate ranging from 1.5 to 4.0.

2. A metallized hot stamping foil according to claim 1 wherein the thermoadhesive layer and the said first lacquer layer comprise one lacquer layer having thermoadhesive properties.

3. A metallized hot stamping foil according to claim 1 or 2 wherein the metal layer is vacuum evaporated and has a thickness of about 0.01 to 0.1μ, preferably 0.03 to 0.06μ.

4. A metallized hot stamping foil according to claim 1 or 2 wherein the metal layer is a metal pigment layer and has a thickness of about 2 to 6μ.

* * * * *